United States Patent

Zurek et al.

[11] 3,908,344
[45] Sept. 30, 1975

[54] SELF ACTUATING MECHANISM FOR BRAKING A DRIVEN MEMBER UPON DISCONTINUATION OF DRIVE THERETO

[75] Inventors: James W. Zurek, Lombard; David A. Fulghum, La Grange, both of Ill.

[73] Assignee: International Harvester Company, Chicago, Ill.

[22] Filed: Jan. 22, 1974

[21] Appl. No.: 435,544

Related U.S. Application Data

[60] Division of Ser. No. 296,462, Oct. 10, 1972, Continuation-in-part of Ser. No. 133,641, April 13, 1971.

[52] U.S. Cl. .................................. 56/11.3; 192/8 R
[51] Int. Cl.² ........................................ A01D 69/10
[58] Field of Search ........ 56/11.3, 17.5, 255; 192/8, 192/15, 16

[56] References Cited
UNITED STATES PATENTS

| | | | |
|---|---|---|---|
| 1,532,877 | 4/1925 | Buck | 192/8 R |
| 1,863,556 | 6/1932 | Cottrell | 192/15 |
| 2,325,917 | 8/1943 | Parker et al. | 192/16 |
| 2,985,992 | 5/1961 | Dowdle | 56/11.3 |
| 3,194,367 | 7/1965 | Winter | 192/16 |
| 3,253,391 | 5/1966 | Meldahl | 56/11.3 |

*Primary Examiner*—Russell R. Kinsey
*Attorney, Agent, or Firm*—Dennis K. Sullivan; Floyd B. Harman

[57] ABSTRACT

A mechanism adaptable for connection between a drive and rotatable shaft to provide a driving connection therebetween when mechanical power flows from the drive to the shaft, the mechanism being operable to produce a self-actuating braking force on the shaft when the power flow is interrupted thereby preventing extended free-wheeling of the shaft.

9 Claims, 12 Drawing Figures

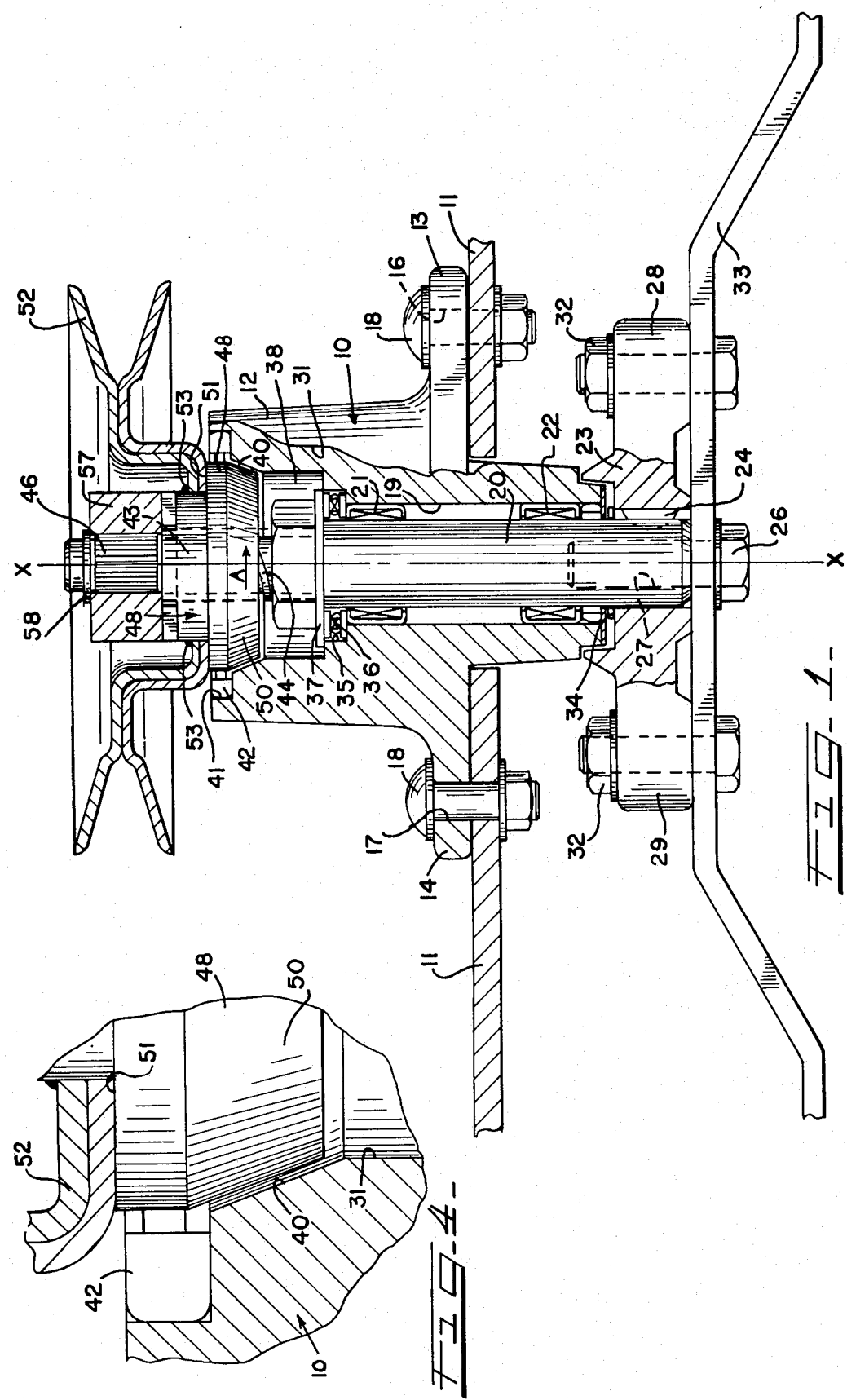

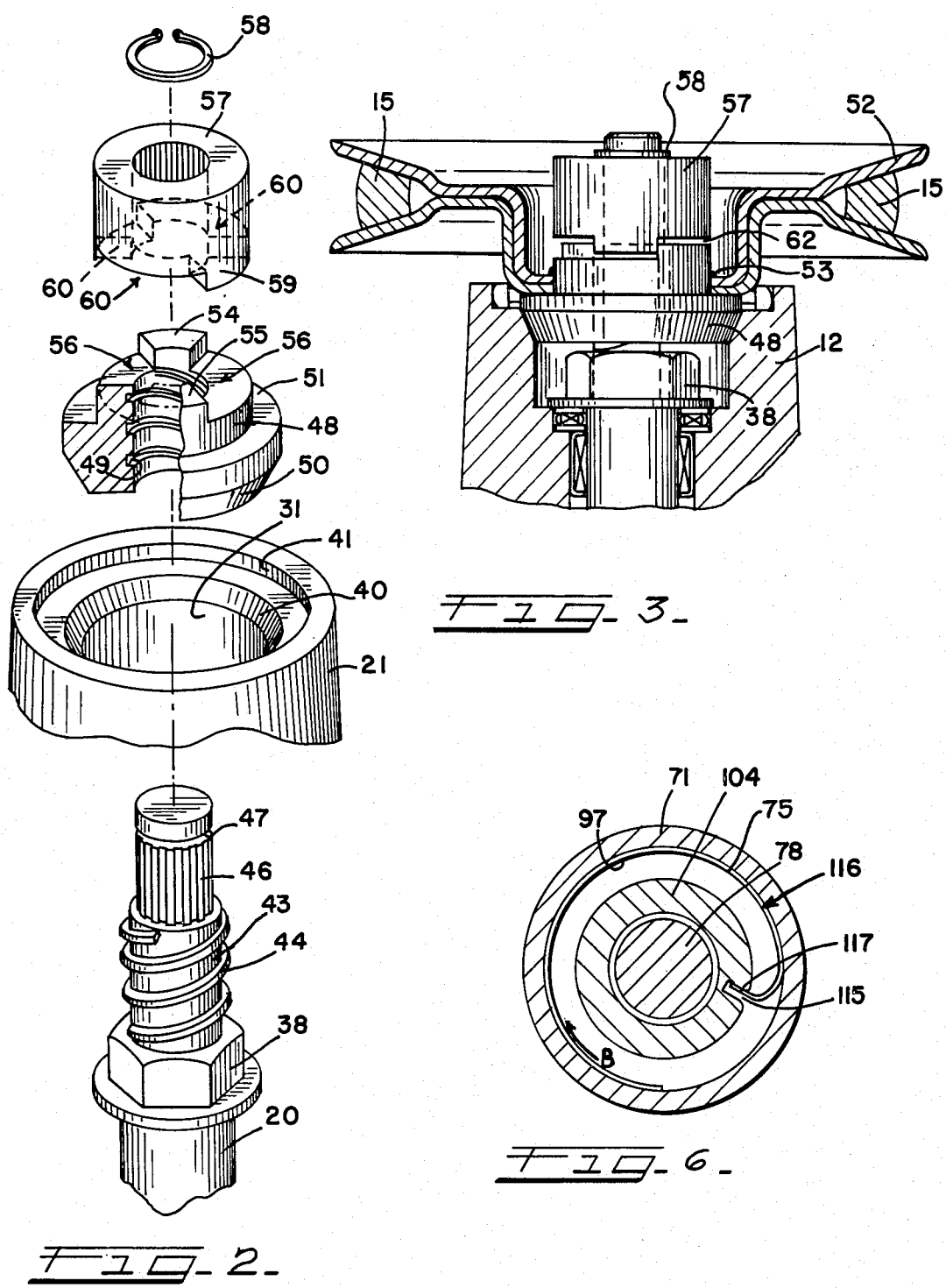

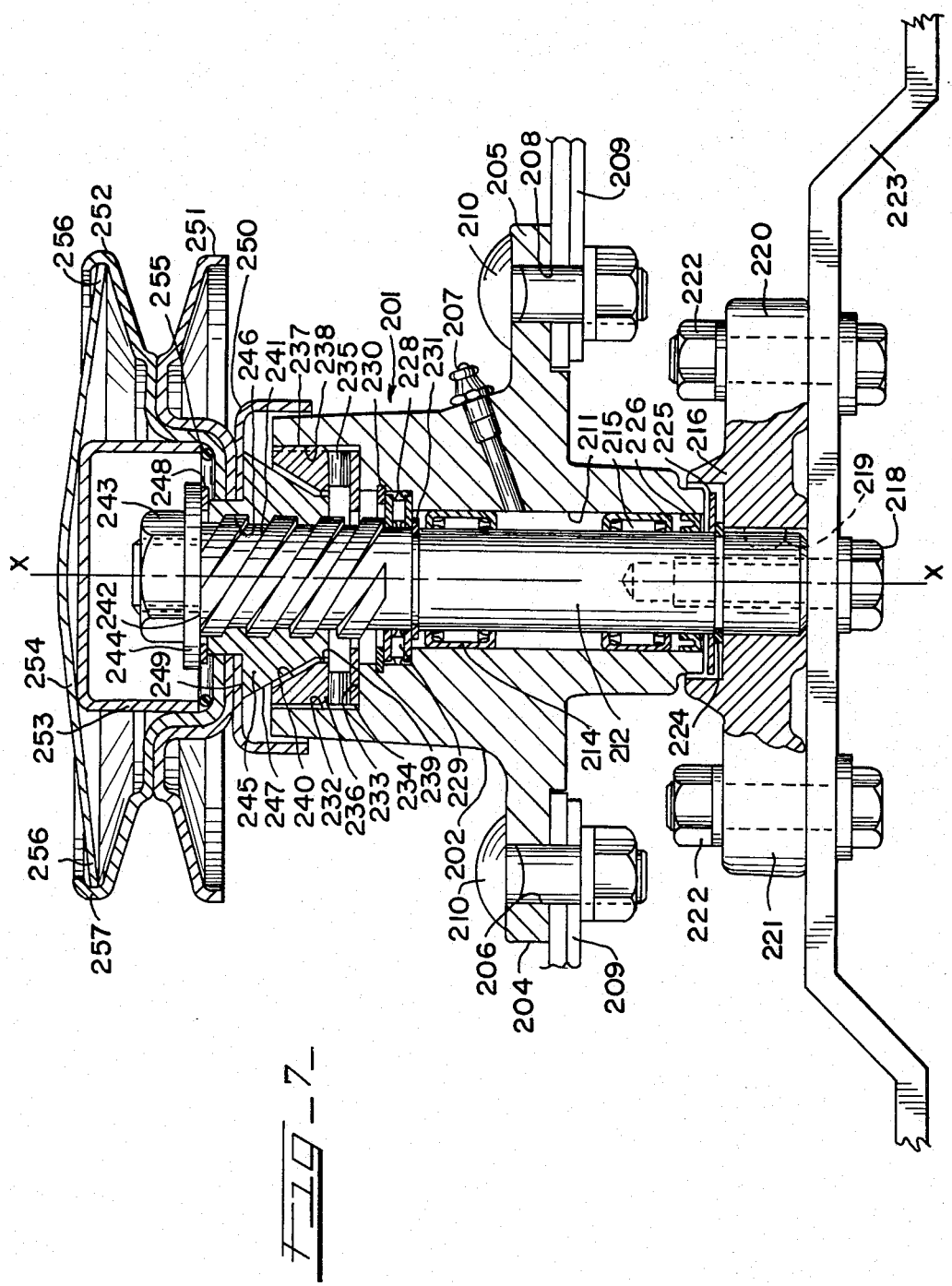

SELF ACTUATING MECHANISM FOR BRAKING A DRIVEN MEMBER UPON DISCONTINUATION OF DRIVE THERETO

CROSS REFERENCE TO RELATED APPLICATIONS

This is a division of application Ser. No. 296,462, filed Oct. 10, 1972 which application is a continuation-in-part of application Ser. No. 133,641, filed Apr. 13, 1971 by the same inventors and assigned to the assignee hereof.

BACKGROUND OF THE INVENTION

Oftentimes it is desirable to provide braking mechanisms on rotating equipment to expend the kinetic energy stored in driven members and thereby prevent extended free-wheeling of those members after a driving source has been disconnected. Manually operated braking devices can, of course, be provided with the attendant disadvantage that they are dependent on an overt act of an operator. It is apparent that in certain situations, such as the driving of rotary cutters in lawn mowers, choppers or other forms of equipment having rotary members more or less accessible to an operator, that manually operable braking devices to stop such rotary members could be employed with an included disadvantage that the operator must continually remember to engage and disengage the brake during operations. Often such devices fall into disuse.

Others have employed overrunning clutches which do not provide a braking action on the rotating members but rather produce an audible sound when the driving source is disconnected which may alert the operator that the rotary member is still in motion.

In general object of the instant invention is to provide a braking mechanism or device operatively connectable to a rotatable member wherein a self-actuating braking force is effected on those members to prevent their extended free-wheeling motion.

Another object of the invention is to provide that the braking device be effective to couple power transmission from a driving source to the rotary members and being operative to produce a self-actuating braking action on those members when the transmitted power is interrupted.

A more specific object of the foregoing is that the invention utilize the momentum of the rotary members while in free-wheeling motion to actuate the mechanism and provide forces to effect the braking action.

Still another object of the invention is to provide that the braking mechanism be adaptable for use in a plurality of positions and substantially independent of gravitational forces.

A general object of the embodiments of the invention herein described is to provide the mechanism be adaptable to mount on a drive shaft carrying the rotatable members and include means for receiving power from the driving source.

Another object of the invention as delineated in the embodiments is to provide a driving connection to the shaft when mechanical power flow is delivered thereto in a certain direction and produce braking forces to the shaft when that flow is reversed.

Still another object of the invention is to provide that an element of the mechanism have a braking surface engageable with another surface to effect a braking action whereat the angular relationship of this surface during engagement produces a wedging action thereat.

A more specific object of the foregoing is to provide that the element of the mechanism having the braking surface and the other surface move into engagement during braking operations wherein the momentum of the rotary members in free-wheeling motion provides forces effecting such movement.

A still further object of one of the embodiments is to provide a mechanism in which the drive shaft is substantially axially static during both driving and braking operations.

A more specific object of the invention is to provide that a supporting structure journalling the drive shaft have braking surfaces disposed in angular interacting relation to the braking surface on the mechanism.

A more specific object of one of the embodiments is to provide a spring supported braking member rotationally fixed to a supporting structure journalling the drive shaft and having a braking surface disposed in angular interacting relation to the braking surface on the mechanism.

Other objects and features of the present invention will become more fully apparent in view of the following detailed description taken in conjunction with the accompanying drawings illustrating embodiments incorporating the inventive concepts hereinafter disclosed.

BRIEF DESCRIPTION OF THE DRAWINGS

FIG. 1 is a side elevational view partially in section of a first embodiment of a drive-brake mechanism incorporating the invention concepts as applied to a simple power transferring device and showing the same in a driving position;

FIG. 2 is an enlarged exploded pictorial view of the drive transfer mechanism shown in the first embodiment;

FIG. 3 is a partial sectional view of FIG. 1 showing the mechanism in a braking position;

FIG. 4 is an enlarged fragmentary sectional view of the interacting braking surfaces of the first embodiment illustrating their angular relationship;

FIG. 6 is a partial sectional view of the mechanism of FIG. 5 taken at line 6—6 of FIG. 5.

FIG. 7 is a side elevational view partially in section of a third embodiment of a drive-brake mechanism having a spring supported braking member and showing the same in a driving position;

DESCRIPTION OF THE PREFERRED EMBODIMENTS

Figure 5:
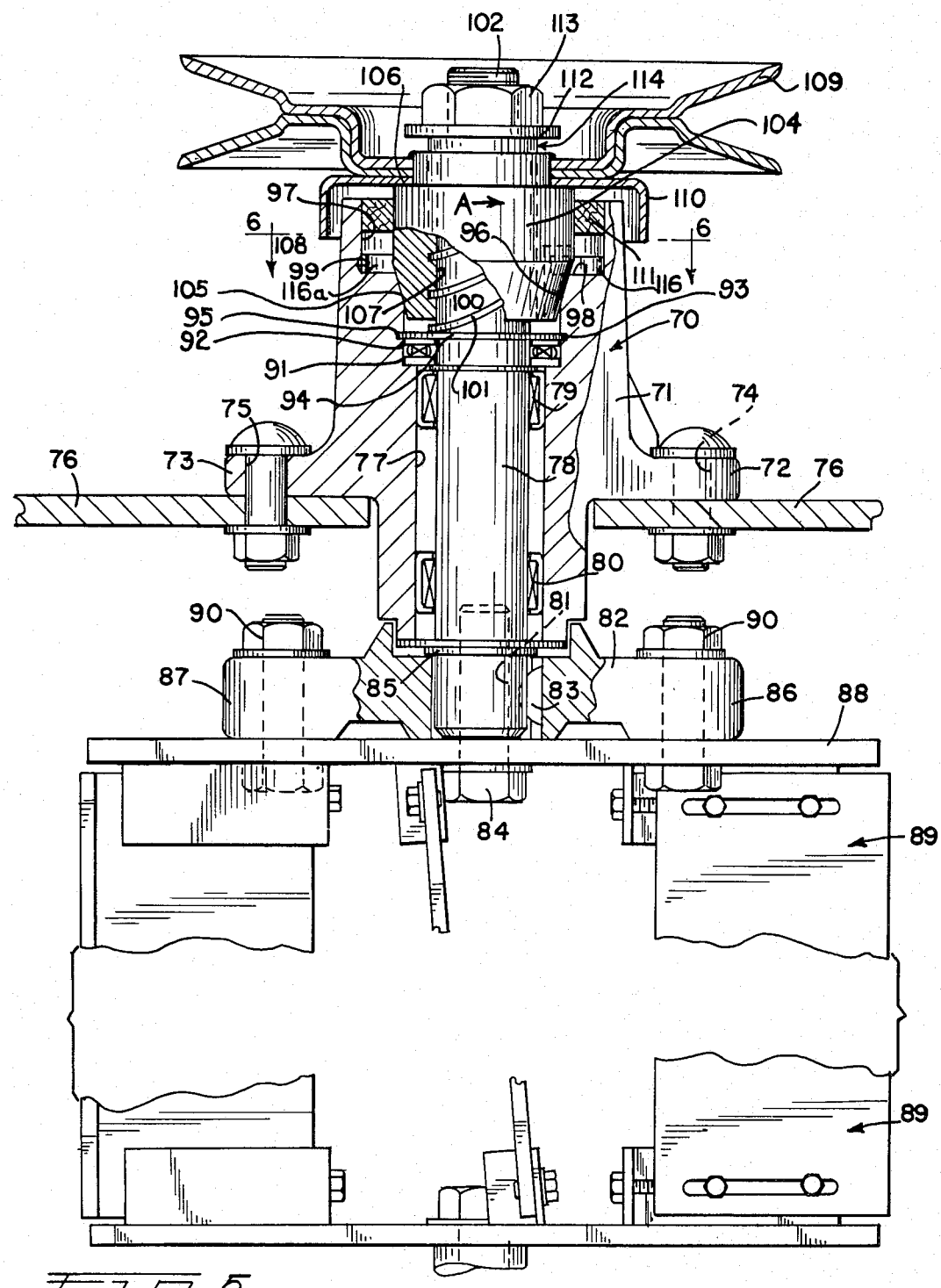
FIG. 5 is an elevational view partially in section of a second embodiment of a drive-brake mechanism and showing the same in a driving position.

Attention is first directed toward FIG. 1 and the first embodiment of the instant invention, namely a drive and self-actuating brake mechanism generally designated 10, mounted in typical operating position on a partially illustrated housing 11 of a rotary cutting machine, such as a mower.

The mechanism comprises a support sleeve 12 having mounting flanges 13 and 14 with holes 16 and 17 through which bolt assemblies designated 18 may be employed to secure the standard 12 to the housing 11.

The standard 12 has a central bore 19 in which a shaft 20 is journalled and rotatably supported by upper and lower bearings 21 and 22 respectively. The mechanism 10 is shown arranged in a vertical orientation for illustration purposes only. It is to be understood that the mechanism may be utilized in other positions than shown and references to an upper or lower disposition of parts is used merely for convenience in describing its structure.

The lower end of the shaft 20 protrudes from the sleeve and has a hub 23 secured thereto by a key 24 and bolt 26 threaded into bore 27 as shown. The hub 23 has a pair of diametrically disposed ears 28 and 29 thereby in which bolt assemblies 32 secure thereto a member 33 which may be a cutting blade of a mower. A wear washer 34 is disposed between the hub 23 and lower edge of sleeve 12.

The upper end of the central bore 19 has a widened portion 35 forming a shoulder which receives a bearing 36 which rotatably supports a washer wear member 37 held in position about the shaft 20 by a nut 38 threadedly secured on a threaded part of the shaft 20 disposed within the widened portion 35 in the position shown. It can be appreciated that this arrangement will prevent substantial axial displacement of the shaft 20 within the standard 12 as the shaft is constrained to rotate about a common and coincidental axis designated X—X of the shaft 20 and central bore 19. Adjacent the widened portion 35 the bore 19 widens at 31 and then flares outwardly to define the braking surface 40 which is conically shaped and symmetrically disposed about the axis X—X. At the upper end of the standard 12 the bore 19 has a still wider portion 41 into which is nested a dust seal 42.

As best seen in FIG. 2 the shaft 20 includes a power drive shank portion 43 which extends outwardly and upwardly from the nut 38. A continuously helical land or rib 44 is spirally formed about said shank 43 and extends from the nut 38 to a shoulder 45 from which extends a diametrically smaller splined portion 46. A groove 47 is provided above the splined portion 46 and that end of the shaft 19, as shown.

A drive member 48 which also serves as a brake member is disposed on the shank portion 43 of the shaft 20. The member 48 has a bore with a spiral groove 49 and interthreadedly fits on rib 44. The lower end of the member 48 has a beveled or conical braking surface 50 which is angled to complementally mate with the braking surface 40 of the support sleeve 12. In operation when member 48 is rotated relative to the shaft 20 in a direction as indicated by arrow A FIG. 3, the member 48 will ride on the rib 44 and move outwardly, that is upwardly, toward the splined portion 46 of the shaft 20. Conversely when relative rotation of the member 48 in the opposite direction occurs it will move in an axial inward or downward direction such, that surfaces 40 and 50 engage. It is preferable that the pitch of the helical rib 44 and the lubrication between the shaft 20 and the member 48 be sufficient to allow the member 48 to rotate freely in the downward direction due to gravity when the shaft 20 is in a vertical position although it will be appreciated that the mechanism is operative in nonvertical positions.

At the upper end of the member 48 the diameter thereof is reduced to provide a shoulder surface 51 onto which a sheave 52 can be affixed to the member 48 by such means as welding as indicated at 53. It is apparent that a sprocket, coupling mechanism or other drive devices could be easily adapted to similarly mount the member 48. A pair of diametrically disposed driving lugs 54 and 55 are provided on this reduced end of the member 48; and each of the lugs (54, 55) are of sector form defining spaces 56 therebetween. Drive hub stop means 57 has a splined inner bore complementally matingly mounted onto the splined portion 46 of the shaft 20 and thereby constrained to rotate therewith. A locking ring 58 is fitted into the groove 47 to hold the hub 57 captive on the shaft 20 between the shoulder 45 and the ring 58 whereby axial movement of the hub 58 is prevented. The inner end of the hub 57 has a pair of diametrically disposed engaging jaw clutch lugs 59 and 60 with spaces 67 therebetween. The spaces 67 have sufficient dimension and are disposed relative to the lugs (54, 55) and spaces (56, 60) to provide for the necessary rotary travel of the member 48 about the shank to effect axial displacement to and from braking engagement with the sleeve 12. FIG. 3 (which illustrates the mechanism 10 in braking position) shows that a gap 62 is provided between the member 48 and the hub 57. The hub 57 should be arranged on the splined shaft shuch that the driving lugs 54 and 55 of the member 48 drivingly engage the lugs 59 and 60 of the driving hub 57, just before the gap 62 closes. This prevents substantial outward axial thrust on the hub 57 by the member 48 when it is being driven in by the sheave 52.

EMBODIMENT OF FIGS. 5 AND 6

Attention is now directed to the second embodiment shown in FIGS. 5 and 6, which depicts another drive-brake mechanism 70 which is operatively similar to the mechanism 10 of the first embodiment, but has certain other novel features hereinafter described.

The mechanism 70 comprises a sleeve 71 having flanges 72 and 73 which have holes 74 and 75 for mounting the sleeve 71 by bolt assemblies as shown to a housing 76 of a chopping mechanism, such as a forage chopper as suggested in FIG. 5. The standard 71 has a central bore 77 into which a shaft 78 is disposed and journalled therein by bearings 79 and 80. The inner end of the shaft 78 extends from that end of the sleeve 71 and has a threaded bore 81. A hub 82 is secured to the shaft by key 83 and bolt 84 with a wear washer 85 providing necessary clearance. The hub 82 has lugs 86 and 87 each with holes for mounting to an end plate 88 of a rotatable element such as a forage chopping rotor designated 89 by means of bolt assemblies 90.

Toward the other end of the sleeve 71 the central bore 77 has a widened portion 91 defining a shoulder against which is placed a bearing 92. A snap ring 93 rides on the bearing 92 and is simultaneously disposed in aligned grooves 94 and 95 disposed in the shaft 78 and the wall of the sleeve at the widened portion 91 of the bore 77 respectively to thereby retain the shaft 78 in position and prevent axial movement thereof. Adjacent the portion 91 the bore 71 flares outwardly and is shaped to form an internal conical braking surface 96. Outwardly from the braking surface 96 the bore 71 is enlarged diametrically and presents a circumferential surface 97 and a radial surface 98. A groove 99 interrupts surface 97 adjacent the surface 98.

The shaft 78 comprises a screw portion 100 which extends from the snap ring groove 94 outwardly toward the outer end thereof. This portion 100 has a continuous helical land or thread 101 disposed thereabout as shown. The shaft 78 extends outwardly beyond the sleeve 71 and thereat has a threaded portion 102 which is diametrically smaller than the screw portion to provide a shoulder surface 103.

A drive-braking member 104 which comprises a cylindrical body with a lower conical surface 105 and an upper shoulder portion 106 has an internal bore 107. A spiral groove or thread 108 is formed in bore 107 and is dimensioned to rotatably fit and screw on and off the screw portion 100 of the shaft 78 by threading on and off thread 101 to effect an axial movement of the member 104 relative to the shaft 78 upon relative rotary motion between the shaft 78 and member 104.

A sheave 109 and dust cover 110 are secured to the member 104 against shoulder portion 106. A dust seal 111 is provided between the body of the member 104 and wall surface 97 of the sleeve 71. A stop washer 112 is disposed on the shoulder 103 of the shaft 78 to restrict (outward) upward axial travel of the member 104 upon relative rotation to the shaft 78. The washer 112 is held in position by nut 113 threadedly fitted on the end portion of the shaft. FIG. 5 shows that a gap 114 has been provided between the washer 112 and the adjacent end of the member 104 when the surfaces 96 and 105 are in engagement. It can be appreciated that when relative rotary motion between the member 104 and the shaft 78 (as indicated by arrow A) occurs the member 104 will axially move (outwardly) upwardly to close the gap 114 and abut the washer 112, and thus the member 104 can move axially from braking contact with the standard 71 to a driving relation with shaft 78 upon being stopped by the washer 112.

The member 104 also has a notch 115 (FIG. 6) extending axially along its body from the beveled end thereof. A drag spring or reaction ring 116 has an inwardly projecting hole or leg 117 entered into the notch 115 and an annular portion 116a compressed within groove 99 in continual frictional engagement with the sleeve 71. The drag ring 116 is formed of spring steel and of such a diameter that it must be compressed to fit into the groove 99 and thus in constant pressure engagement with the sleeve 71. This provides a frictional retarding force on the member 104 manifested as a counter torque being generally opposite in direction to a driving torque applied to drive the member 104 in the direction indicated by the arrow B.

OPERATION OF EMBODIMENT OF FIGS. 1-4

The operation of the first embodiment is as follows: First consider the mechanism 10 being mounted on the mower housing 11 and in the braking mode as shown in FIG. 3, and a drive belt as indicated at 15 transmits driving torque from a suitable power source (not shown) to the sheave 52 and the member 33 causing them to rotate relative to the shaft as indicated by the arrow A.

As this occurs action between the land 44 on the shaft 20 and the groove 47 of the member 48 provides axial movement of member 48 such that the braking surfaces 40 and 50 disengage. The axial movement continues until the lugs 54 and 55 of the member 48 drivingly engage the lugs 59 and 60 of the driving hub 57 wherein the relative rotation movement between the member 48 and shaft 20 ceases and they both begin to rotate together with the member 48 driving the shaft 20 through the hub 57 whereby the cutting element 33 is rotated at a selected speed. It should be noted that the entire driving torque is tangentially applied to the shaft 20 by the peculiar engagement of the member 48 and driving hub 57. As long as the belt 15 is driven at the same rate the member 48 remains in driving relation to the hub 57 as hereinbefore described; this is because some torque is continually required to be delivered to the mechanism to maintain the selected speed of the cutting element 33.

When the driving torque delivered from the source is interrupted such as through the loosening of the belt 15 (through a suitable idler arrangement not shown), the momentum of the moving cutter element 33 now supplies torque to the hub 57 to drive the sheave 52 and the member 48. Torque must be supplied to drive the member 48 due to its resistance to stay in motion caused by actions such as a wind resistance on the sheave and frictional resistance of the dust seal 42 contacting the member 48 producing a retarding or counter torque thereon. The cutting element 33 secured to the hub 57 now provides the driving torque. It can be appreciated that in order for the hub 57 to drive the member 48 there must be relative counter-rotation between the member 48 and shaft 20. When this occurs the member 48 counter-rotates relative to the shaft 20 wherein it moves axially inward or downwardly toward the standard 12 due to the action of the land 44 and groove 49. This inward movement continues until the braking surfaces 40 and 50 engage. The engagement of the braking surfaces 40 and 50 increase the counter-torque applied to the member 48 which in turn increases the inward axial thrust due to the increased lag or retardation of the member 48 relative to the rotating shaft 20 and therefore, action of the mechanism 10 is self-actuating and self-generating.

OPERATION OF EMBODIMENT OF FIGS. 5 AND 6

The operation of the second embodiment is essentially the same as that of the first. The drive-brake member 104 rotates relative to the shaft 78 when the sheave 109 is driven by a power source. This produces an initial relative rotational movement between the shaft 78 and the member 104 which causes the member 78 to move axially (outward) upwardly through the action of the land 101 and groove 108 on the member 104 and shaft 78 respectively. The member 104 continues to move axially until restrained by the stop washer 112 whereat the braking surfaces 105 and 96 of the member 104 and standard 71 respectively are disengaged and the member 104 is in driving relation to the shaft 78. In this embodiment the drag ring 116 provides an initiating counter torque on the member 104 which effects counter-rotation of the member 104 when the driving torque applied to the sheave 109 is interrupted.

At this time the momentum of the rotor 89 is now the driving force on the shaft 78 and the counter-torque produced by the ring 116 along with the shaft 78 being in driving relation to the member 104 cause a counter-rotation of the member 104 on the shaft 78 producing an attendant inward axial movement of the member 104 until the braking surfaces 105 and 96 engage. When this occurs the braking action becomes self-generating because the counter-torque is initially increased which in turn increases the inward thrust of the member 104 thereby forcing the braking surfaces more tightly together.

THE EMBODIMENT OF FIGS. 7–12

Attention is now directed to the third embodiment, shown in FIGS. 7 to 12, which depicts still another drive-brake mechanism which is operatively similar to the mechanisms 10 and 70 of the first two embodiments but has certain other novel features hereinafter described.

In this embodiment the braking surface which was a portion of the support sleeve in the previous embodiments is now a separate braking member which is supported by one or more wave springs in the support sleeve and is slidably mounted therein to permit axial movement while being prevented from rotating. Thus the braking force of the drive member is first exerted against the wave spring and then against the support sleeve. It will become apparent that this braking member mechanism could easily be incorporated in either of the previous embodiments.

The mechanism 201 comprises a support sleeve 202 having a grease fitting 207 therein and having flanges 204 and 205 which have holes 206 and 208 for mounting the sleeve to a housing 209, such as the housing of a rotary cutting machine, by means of bolt assemblies 210. The support sleeve 202 has a central bore 211 in which a shaft 212 is journalled by means of upper and lower bearings 214 and 215.

The shaft 212 protrudes from the sleeve and has a hub 216 which is secured on the shaft against snap ring 224 by means of bolt 218 and key 219. The hub 216 has a pair of diametrically disposed flanges 220 and 221 through which bolt assemblies 222 secure thereto a member 223 which may be a cutting blade. A wear washer 225 is disposed between the snap ring 224 and the lower edge of the support sleeve 202 and provides running clearance therebetween. A grease seal 226 is disposed between shaft 212 and the support sleeve 202 just inside the lower edge thereof.

Figure 10:
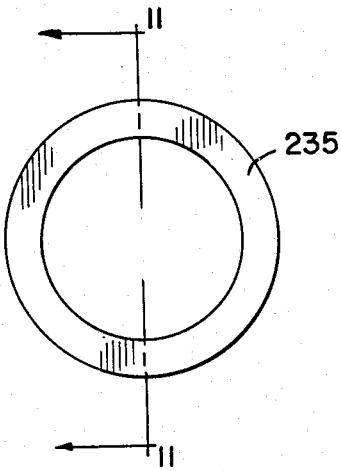
FIG. 10 is a top plan view of one of the braking member supporting springs shown in FIG. 7.
Figure 11:
FIG. 11 is a sectional view of the braking member supporting spring of FIG. 10 taken along the line 11—11 of FIG. 10.
Figure 12:
FIG. 12 is a side elevational view of a portion of the braking member supporting spring shown in FIG. 7 showing the circumference of the spring straightened out.

Toward the upper end of the central bore 211 there is a widened portion 228 forming a shoulder which receives thrust bearing 229 which is held in place in the bore by a snap ring 230 and is supported on the shaft 212 by snap ring 231. Further toward the upper end of central bore 211 is a still wider portion 232 forming a shoulder 233 receiving wear washer 234 supporting one or more wave springs 235 which in turn support the braking member 236. As seen in FIGS. 10, 11 and 12, the wave spring 235 comprises a ring of spring steel which has an axial configuration in the nature of a wave, for example, a sine wave, with two or more peaks preferably disposed equally about the circumference. The amount of wave springs 235 used should preferably be selected to produce a spring force sufficient to withstand the entire braking force imposed on the braking member 236 without becoming solid in order to maintain uniform torque loading on the shaft 212 during braking.

Figure 8:
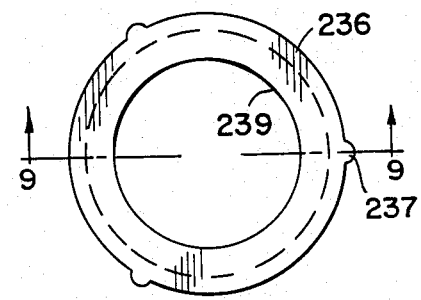
FIG. 8 is a top plan view of the braking member shown in FIG. 7.
Figure 9:
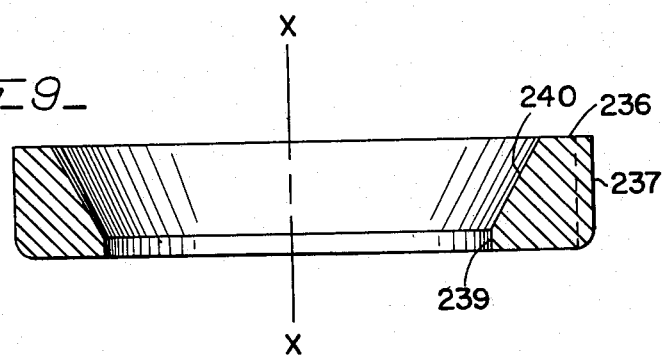
FIG. 9 is a sectional view of the braking member of FIG. 8 taken along the line 9—9 of FIG. 8.

As seen in FIGS. 8 and 9, the braking member 236 has a plurality of lugs 237 on its outer periphery which matingly engage with corresponding indentation 238 (shown in FIG. 7) in the bore portion 232 thus permitting the member 236 to slide axially in the bore 211 without rotating. The inner bore 239 of the braking member 236 flares outwardly to define a braking surface 240 which forms a portion of a right circular cone about the coincidental axis X—X of the braking member 236, the central bore 211, and the shaft 212.

The shaft 212 protrudes from the top of the support sleeve 202 and toward its upper end has a continuously helical land or rib 241 spirally formed about said shaft which, when assembled in the support sleeve 202, extends from a point below the support sleeve shoulder 233 to a shoulder 242 on the shaft 212 from which extends a diametrically smaller threaded portion for mounting nut 243 and washer 244.

Drive member 245 (which also serves as a brake member) is disposed on the shaft 212 on the ribbed portion. The member 245 has a bore with a spiral groove 246 and interthreadedly fits on rib 241. The outer periphery of the lower end of the member 246 forms a conical braking surface 247 which is angled to complementally mate with the braking surface 240 on the braking member 236. The axial length of the drive member 245 is sized such that when it rotates axially inwardly or downwardly on the shaft 212 in the bore 211, the lower surface will contact wear washer 234 forming a secondary braking surface after the wave springs 235 have been deflected a selected amount by the action of the braking surface 247 on the braking surface 240 on the braking member 236, the amount of deflection of the wave springs defining the constant braking torque. A spacer 248 is disposed between the drive member 245 and the washer 244 to prevent their locking up during operation.

In operation, when the drive member 245 is rotated counterclockwise relative to the shaft (as viewed from the lower or blade end of the shaft), the member 245 will ride on the rib 241 and move outwardly, that is upwardly, toward washer 244 or toward the driving position. Conversely, when the drive member 245 is rotated in the opposite direction relative to the shaft 212, it will move downward such that the braking surfaces 247 and 240 engage and the drive member 245 and wear washer 234 will subsequently engage. It is preferable that the pitch of the helical rib 241 and the lubrication between the shaft 212 and the member 245 be sufficient to allow the member 245 to rotate freely in the downward direction due to gravity when the shaft is in a vertical position, although it will be appreciated that the mechanism will operate in nonvertical positions.

At the upper end of the member 245, the diameter thereof is reduced to provide a shoulder or land 249 onto which dust shield 250 and pulley sheaves 251 and 252 may be affixed to the member 245 as by welding to form a drive pulley for the assembly. It is apparent that other drive means, such as a sprocket or coupling mechanism, could also be suitably mounted to a drive member 245. Dust cover 253 is mounted in the center of sheave 252 and is held in place by the spring force exerted by strip 254, the ends 256 thereof being restrained by the rolled over upper edges 257 of sheave 252. Since the dust cover may also form a grease reservoir for lubricating the drive mechanism, an O-ring seal 255 is disposed between dust cover 253 and sheave 252.

OPERATION OF THE EMBODIMENT OF FIGS. 7–12

In the operation of the mechanism 201, when a counterclockwise driving torque (as viewed from the lower end) is applied to drive member 245, as by a drive belt (not shown) attached to a suitable power source transmitting torque thereto through pulley sheaves 251 and 252, the member 245 rotates and moves axially outwardly or upwardly on the shaft 212 disengaging the braking surfaces 240 and 247. The axial movement of drive member 245 continues until the member 245 engages spacer 248 which in turn engages washer 244 attached to the upper end of the shaft 212 to form a driving connection therebetween. At this point, relative movement between the drive member 245 and the shaft 212 ceases and they begin to rotate together whereby the cutting element 223 is rotated at a selected speed. As long as torque is continually provided to the mechanism through the pulley sheaves, the member 245 will remain in driving relation to the shaft 212 and to the cutting element 223.

When the driving torque applied to the member 245 through the pulley sheaves 251 and 252 is interrupted as by the loosening of the drive belt, the momentum of the moving cutter element 223, which acts similar to a flywheel, supplies torque to the shaft 212 causing it to rotate relative to the member 245, action such as wind resistance on the sheaves and friction from a loose belt thereon tending to produce a retarding torque on the drive member 245. If a positive retarding torque means is desired, for example, when a coupling mechanism is used in place of the pulley sheaves 251 and 252, the drag ring 116 illustrated in the second embodiment (shown in FIG. 6) may be incorporated in this mechanism.

The rotation of the shaft 212 relative to the drive member 245 causes the drive member to counter-rotate on the shaft and move axially inwardly or downwardly toward the braking member 236 and the wear washer 234. When the braking surfaces 240 and 247 engage, the counter-torque or braking torque applied to drive member 245 and shaft 212 rapidly increases, thereby increasing its axial thrust, and the wave springs 235 begin to deflect. The axial movement of the drive member 245 continues further increasing the braking torque as the wave springs deflect until the lower surface of the drive member 245 contacts wear washer 234 causing axial movement of the drive member to cease. The wave springs then impose a constant braking force on the drive member 245 and consequently a constant braking torque on the shaft 212 and brake member 223 until the blade 223 stops.

Thus, this embodiment of a self-actuating brake mechanism prevents the application of peak torsional loads on the shaft which might tend to twist it and ultimately cause a failure.

It will be appreciated that the embodiment of the invention chosen for the purposes of illustration and description herein are preferred based upon requirements for achieveing the objects of the invention and developing the utility thereof in the most desirable manner, due regard being had to existing factors of economy, simplicity of design and construction, production methods and the improvements sought to be effected. It will be understood that the particular structural and functional aspects emphasized herein are not intended to exclude but rather to suggest such other modifications and adaptations as fall within the spirit and scope of the invention. For example, the wear washer 234 of the third embodiment might be omitted if constant braking torque on the shaft 212 is not considered important a$_n$d a gradually increasing braking torque can be tolerated as opposed to an abrupt stop.

What is claimed is:

1. For an implement having a cutter, a drive brake mechanism for driving and braking said cutter, automatically shiftable between drive and brake conditions in response to the direction from which the driving torque is delivered thereto comprising:

support means;

a braking member having a first braking surface thereon slidably non-rotatably mounted in said support means;

spring means interposed between said braking member and said support means, said spring means biasing against axial movement of said brake member toward said support means;

torque transfer means journalled on said support means;

torque transmitting means coupled by coupling means to said torque transfer means, said torque transfer having means rotatably drivable from a source of driving torque, said torque transmitting means including a second braking surface disposed for engagement with said first braking surface;

a normally driven energy-storing structure such as a cutter positively connected with said torque transfer means and driven thereby attendant to said torque transfer means being driven by said torque transmitting means and in driving relation to said torque transfer means upon termination of drive thereto from said torque transmitting means;

shifting means responsive to the direction from which driving torque is transmitted between said torque transfer means and said torque transmitting means, operative to effect axial movement of said torque transmitting means to a position disengaging said braking surfaces and establishing a driving relation with said torque transfer means upon said torque transmitting means being driven by a source of driving torque and operative to effect axial movement of said second braking surface of said torque transmitting means into engagement with said first braking surface upon said torque transfer means being driven by said energy storing structure.

2. The invention as recited in claim 1 wherein said shifting means comprises interthreaded threads on said torque transmitting means and said torque transfer means to produce counter-axial displacement of said torque transmitting and torque transfer means to effect a driving of said torque transfer means by axial displacement of the torque transmitting means in one direction and the braking of said torque transfer means through axial displacement of the torque transmitting means in the other direction such that said braking surfaces engage.

3. In an agricultural implement of the type having a housing mounting a rotor driven from an associated source, the improvement comprisin a drive-brake mechanism comprising:

a sleeve mounted on said housing;
a braking member having a braking surface thereon slidably mounted in said sleeve;
spring means disposed between said brake member and said sleeve;
a shaft journalled through said sleeve and comprising a spiral land;
a rotor mounted on the shaft; and
an input member rotatably drivable by said source, said member having a spirally grooved bore threaded on said land wherein reverse relative rotary motions between said input member and said shaft effect corresponding axial displacements of said input member on said shaft, and said input member including a braking surface disposed adjacent to said braking surfaces of said braking member for engagement therewith when the rotor overruns the driving source.

4. The invention according to claim 1 wherein said spring means comprises a wave spring.

5. The invention in accordance with claim 1 and stop means associated with said support means and disposed to limit the axial movement and said torque transmitting means toward said support means such that said spring means is prevented from becoming solid.

6. The invention in accordance with claim 3 and said spring means comprising a wave spring.

7. The invention in accordance with claim 3 and stop means mounted in said sleeve and disposed to prevent axial movement of said input member to a point where said spring means is solid.

8. A rotary mower comprising
a housing, a support sleeve mounted on said housing, a shaft rotatably mounted in said support sleeve, a cutting blade mounted on said shaft, a braking member having a first braking surface slidably mounted in said support sleeve, spring means disposed between said braking member and said support sleeve, and an input member having means drivable from an associated source of power and having a second braking surface thereon, said input member being relatively rotatably and axially movably mounted through means to said shaft for movement between a first position disengaging said braking surfaces from contact and providing a driving coupling between said input member and said output shaft upon power being supplied to said input member from said source, and a second position engaging said braking surfaces and providing a braking coupling with said shaft upon said source being interrupted.

9. The invention in accordance with claim 8 and stop means mounted in said sleeve and disposed to prevent axial movement of said input member to a point wherein said spring means becomes solid.

* * * * *